United States Patent [19]

McCarter et al.

[11] Patent Number: 5,395,707
[45] Date of Patent: Mar. 7, 1995

[54] ENVIRONMENTALLY SAFE WATER-ACTIVATED BATTERY

[75] Inventors: Walter K. McCarter, Davie; John F. Flood, Plantation; Jorgen T. Fischer, Margate, all of Fla.

[73] Assignee: ACR Electronics, Inc., Fort Lauderdale, Fla.

[21] Appl. No.: 58,927

[22] Filed: May 7, 1993

[51] Int. Cl.[6] .................... H01M 2/18; H01M 4/70
[52] U.S. Cl. .................... 429/119; 429/128; 429/130
[58] Field of Search ............... 429/119, 128, 130

[56] References Cited

U.S. PATENT DOCUMENTS

| | | | |
|---|---|---|---|
| 1,332,483 | 3/1920 | Bridge | 429/130 X |
| 3,255,048 | 6/1966 | Comanor et al. | 429/130 X |
| 3,884,720 | 5/1975 | Armstrong | 429/119 |
| 4,185,143 | 1/1980 | Birt et al. | 429/119 |
| 4,332,864 | 6/1982 | King et al. | 429/119 X |
| 4,822,698 | 4/1989 | Jackovitz et al. | 429/119 X |

Primary Examiner—Stephen Kalafut
Attorney, Agent, or Firm—Malin, Haley, DiMaggio & Crosby

[57] ABSTRACT

A water-activated, primary reserve battery for use in an environment, such as the ocean, that provides an environmentally safe battery, especially useful in sonobuoys. The battery includes the use of cuprous iodide as a cathode and magnesium as the anode in an array to provide voltage, amperage, and operational time equivalent to conventional lead chloride batteries. Once the sonobuoy is no longer useful as it deteriorates in the environment, no lead will be presented into the ocean. The structural frame members protect the cuprous iodide which is brittle in a rigid array and provides for proper venting of gas and sludge formation to insure efficient operation of the battery.

4 Claims, 7 Drawing Sheets

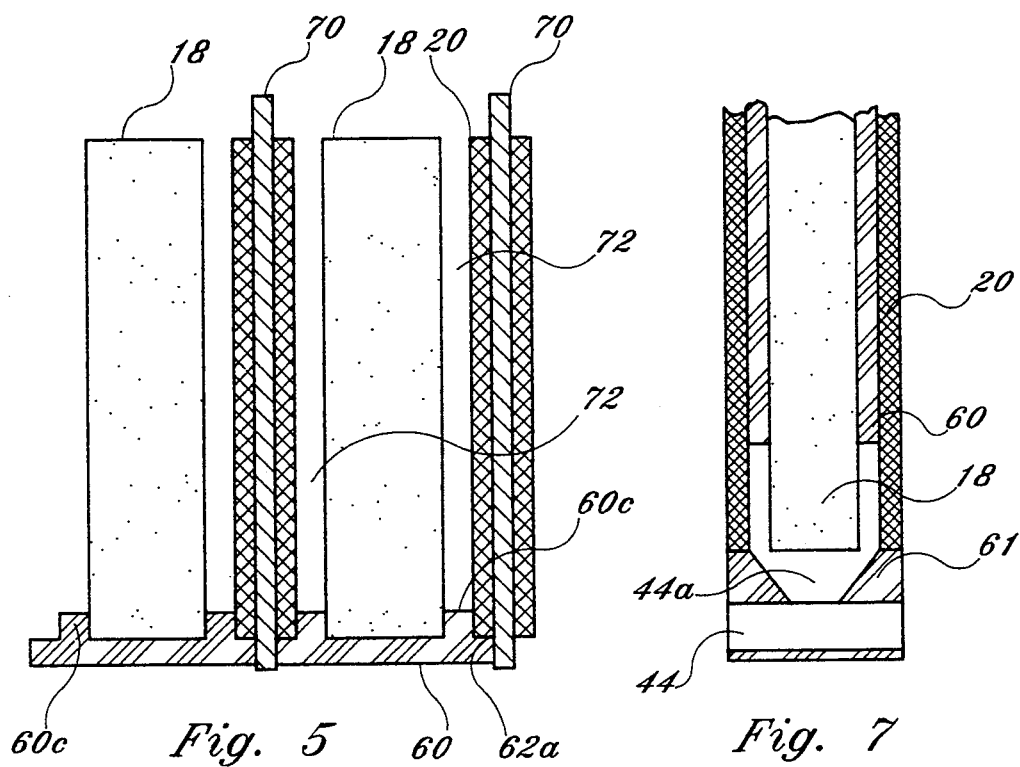
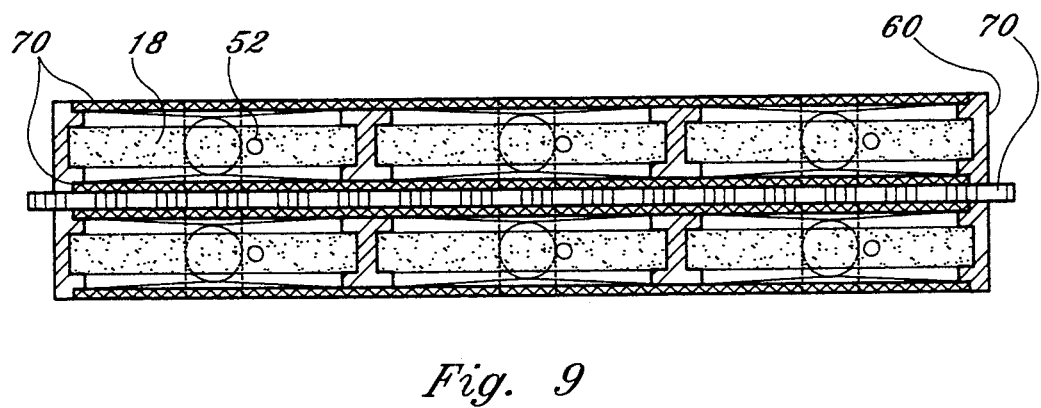

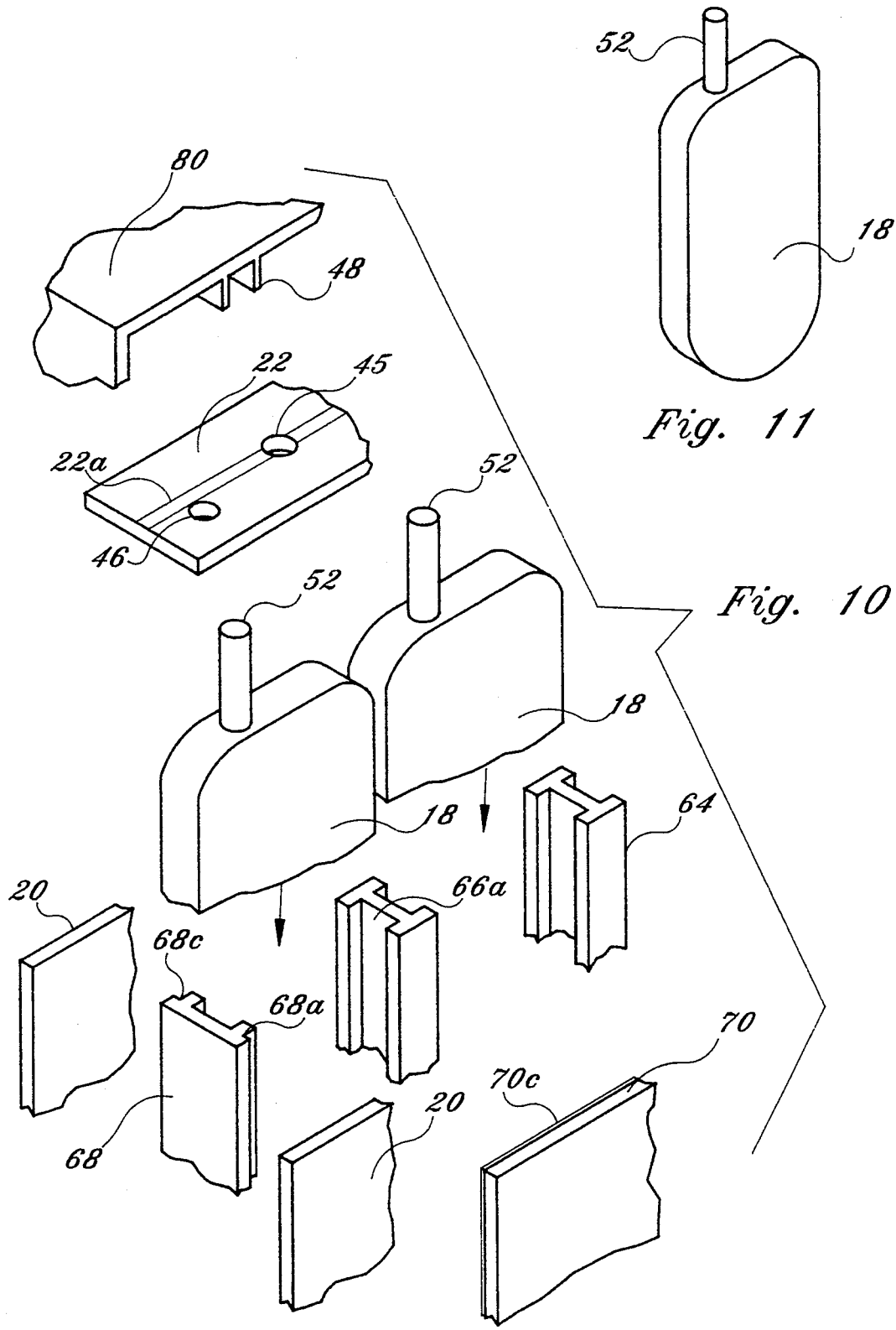

ENVIRONMENTALLY SAFE WATER-ACTIVATED BATTERY

BACKGROUND OF THE INVENTION

1. Field of the Invention

This invention relates to primary reserve, water-activated batteries, and specifically, to an improved water-activated battery that is environmentally safe that eliminates lead in the battery and is used for providing a DC power supply to devices that are utilized in an ocean or sea environment, such as with sonobuoys acoustic listening devices used for anti-submarine operations.

2. Description of the Prior Art

The use of primary reserve, water-activated batteries is well known. Typically, a water-activated battery has a long shelf life and finds service in a single application that, once activated by salt or fresh water, operates for a period of time, whereafter its usefulness is spent. Typically, the conventional water-activated battery includes an electrode made of lead or silver chloride. In recent years, the EPA has restricted and, in some instances, banned certain products containing lead that are released into the environment. When a water-activated, primary reserve battery is used in a system such as a sonobuoy, which is an acoustic receiver and RF transmitter disposed into the ocean for anti-submarine warfare exercises, ultimately the ocean is exposed to the lead chloride electrode compositions of such batteries, causing lead to be received into the ocean or sea environment. Thousands of sonobuoys a year are used.

The purpose of this invention is to provide an environmentally safe, water-activated, primary reserve battery that can be used for a system requiring battery power safely in the environment such as the ocean and which does not allow for any lead contamination.

The battery in the present invention utilizes cuprous iodide as one electrode in conjunction with a magnesium electrode, providing for an environmentally safe battery that can equal the electrical output specifications found in the prior use of lead chloride electrode water-activated batteries. Thus, with the utilization of the present invention in a device such as a sonobuoy, the environment is maintained safe.

SUMMARY OF THE INVENTION

This invention relates to a water-activated, primary reserve battery that can be useful in a system such as a sonobuoy to provide a predetermined current and voltage for a specified amount of time and that is functionally comparable to a lead chloride electrode water-activated battery, wherein cuprous iodide is used as one electrode and magnesium is used as the other electrode in a specifically designed array of electrodes and cells, having a housing and cell frame member that allow for proper venting of gas and removal of sludge to insure maximum efficiency of the battery system.

The battery also includes a special frame wall and cell structure to prevent shorting of the battery, which would greatly hinder its output performance through the strategic location of the array of cells and cell division.

In a specific water-activated battery to provide approximately 16 volts of output with 400 milliamps of current for eight hours, it has been determined that twelve individual cells will be employed that are connected side-by-side in a strategic array.

Each cell utilized in the battery is constructed with a special frame and includes three flat, rectangularly-shaped, elongated cuprous iodide pellets lying in a single plane in a side-by-side relationship, separated by the elongated frame members for rigidly holding the pellets in place.

One of the aspects of this invention is that cuprous iodide pellets are made from powdered metal and are very brittle. Therefore, it is important for the reliable operation of the battery that the cuprous iodide pellets be strategically sized to prevent breakage of the pellets and mounted in a suitable protective frame based on the size of each pellet to prevent destruction of the cuprous iodide pellets.

Each cell has, on two sides, parallel, thin planar magnesium plates (electrodes)spaced approximately 0.040 inches apart from the surface of the cuprous iodide pellets, which also are mounted in the frame, allowing for space for the electrolyte (water) to pass between the magnesium and the cuprous iodide, allowing for the generation of electricity through the electrolyte. Each cell has on one exterior side of the magnesium, a plastic insulating sheet that is waterproof and electrically non-conductive, placed on the surface of the magnesium electrode plate on one side, defining the outside of a cell. Thus, the cell is comprised of a frame, having four elongated arms that receive three very thin, substantially rectangular pellets of cuprous iodide, and grooves that allow for magnesium plates spaced apart from the surface areas of the cuprous iodide to be placed on the outsides for a single battery cell.

In order to achieve 16 volts, a plurality of cells, in this case twelve, are mounted together in a side-by-side array in an overall housing that includes several essential components. Each cell must be linked to an adjacent cell electrically in series. The three iodide pellets are electrically connected together in parallel as one electrode output. Each of the cells are connected in series by soldering adjacent cell electrodes. The bottom part of the overall battery housing includes a plurality of conduits, each strategically connected through apertures in the frame members that allow for sludge to be expelled from each cell during the activation of the battery. If the sludge is not expelled from the battery, the battery output can diminish and possibly not produce sufficient voltage and current. Likewise, the top part of the battery housing includes a planar housing member adjacent each cell, circuit board connecting three pellets together, and also includes a conduit system that allows gas to escape that is created during the activation of the battery, allowing the gas to escape from each cell to insure proper operation.

Thus, in order to utilize cuprous iodide, because of its brittle nature, but while achieving sufficient voltage output as required to equal the performance of a conventional lead chloride electrode battery, the present invention provides for a compact, rigid mounting frame and housing structure to accommodate cuprous iodide pellets, and magnesium electrode electrical connections through circuit board circuit elements, and a network of gas venting and sludge expelling outlets contained in the housing, which ensure the performance of the cuprous iodide and magnesium electrodes. Once the entire housing is assembled, the cell electrodes are arranged so that in the embodiment using 12 cells for 16 volts, the anode and cathode electrodes meet at a center line, wherein the twelve cells are divided electrically into two separate battery segments of six cells each, connected by a common wire along the exterior so that the battery fluid will not short out the battery across the large distance from one end of the first cell to the opposite end of the twelfth cell. This prevention of shorting of the battery greatly improves the efficiency of the battery. A resultant output anode and cathode are mounted as originating one from a group of six cells and the other from the other six cells, through circuit conductors to the operating system, such as the sonobuoy system. Typically, the entire battery will be firmly mounted in a sonobuoy housing, which often is an elongated cylinder with holes to permit ocean or sea water to flow into the housing and then through openings in the battery housing, where the water can activate the battery.

Through the use of cuprous iodide as one electrode and magnesium as another electrode, the use of lead in the battery has been completely eliminated. This has been done without sacrificing any performance in voltage current or battery operational life, making the use of this battery completely safe in the environment.

It is an object of this invention to provide an improved, water-activated, primary reserve battery that is environmentally safe for use in any area, including an ocean environment.

It is another object of this invention to provide an improved, water-activated, primary reserve battery that includes an improved structural array of cuprous iodide pellets to preserve the structural integrity of the cuprous iodide pellets while permitting proper venting of gas and removal of sludge, which would otherwise impede operation of the battery.

And yet another object of this invention is to provide an improved, water-activated, primary reserve battery that can be used safely in a sonobuoy without environmental damage, while at the same time meeting all of the specification requirements, including current, voltage, and time requirements conventionally found in lead chloride electrode batteries.

In accordance with these and other objects which will be apparent hereinafter, the instant invention will now become described with particular reference to the accompanying drawings.

BRIEF DESCRIPTION OF THE DRAWINGS

FIG. 5 shows a side elevational view in cross section, showing two cells used in the present invention.

FIG. 7 shows a side elevational view, cut away, through a single cell of the base portion in the present invention.

FIG. 9 shows a top plan view, in cross section of a portion of the present invention with two cells side-by-side.

FIG. 10 shows an exploded, partially cut away view of a single cell upper corner utilized in the present invention.

FIG. 11 shows a perspective view of a single pellet of cuprous iodide used in the present invention.

DESCRIPTION OF THE PREFERRED EMBODIMENT

Figure 1:
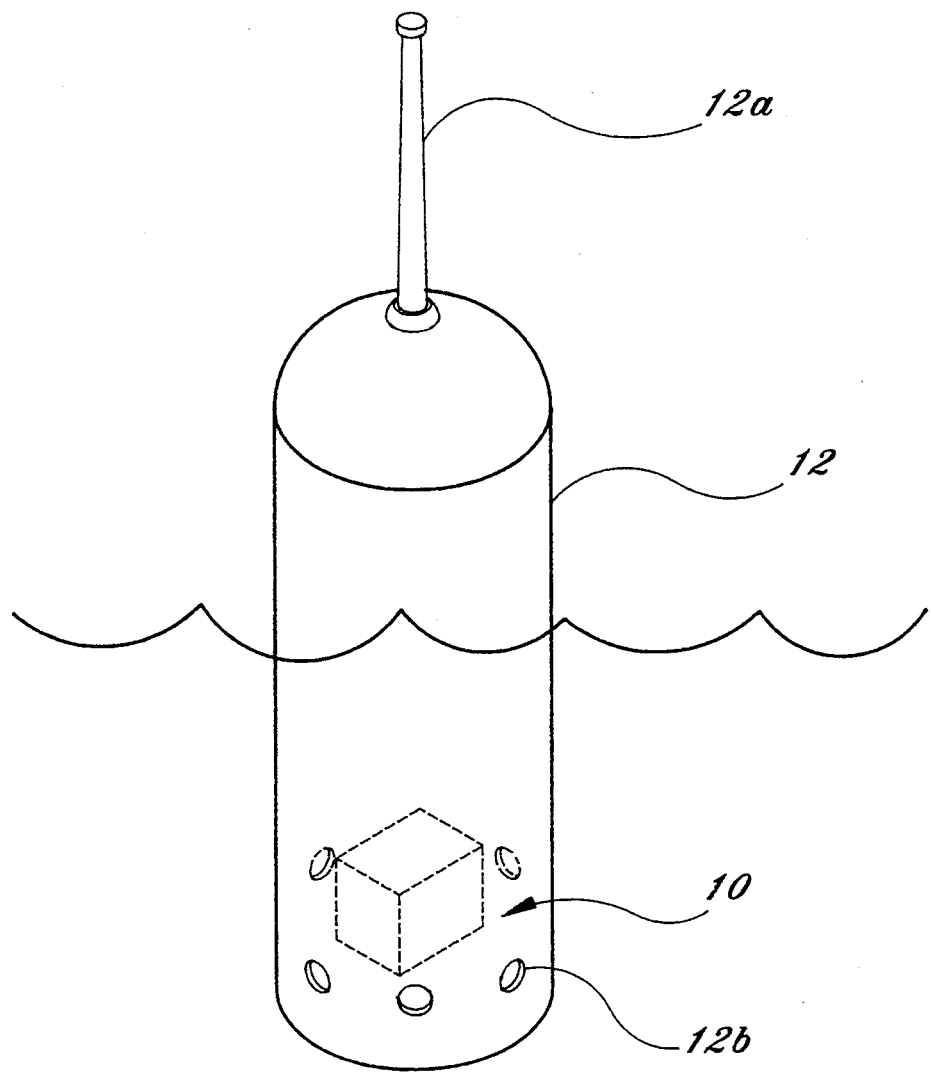
FIG. 1 shows a sonobuoy in perspective that includes the present invention 10.

In the preferred embodiment, the invention 10 is shown as a dotted element enclosed in a sonobuoy 12 that includes an antenna 12a connected into the system. The battery 10, in accordance with the present invention, provides power once the sonobuoy 12 has been immersed in water, such as in the ocean, which will allow water to pass through holes 12b in the sonobuoy housing for receipt into the battery 10 mounted therein to activate the water-activated battery. This provides power to sonobuoy 12 and activates the sonobuoy.

A sonobuoy is a buoy equipped with a hydrophone for detecting underwater sounds and an automatic radio transmitter for transmitting the sounds and developed as a submarine detector which is dropped by parachute from an aircraft into the ocean for transmitting the coded sounds of submerged submarines to air and surface craft. Once the sonobuoy is dropped into the body of water, the battery is activated, activating the entire device. The battery in such a case will have a definite performance life, at which time the sonobuoys will just be left in the ocean until destroyed by natural elements. In such a case, if the sonobuoy battery contains lead, then the lead will be dissipated into the ocean, causing environmental pollution. The present invention, however, utilizes cuprous iodide and magnesium as the battery elements to achieve electricity, as is fully described below.

Figure 2:
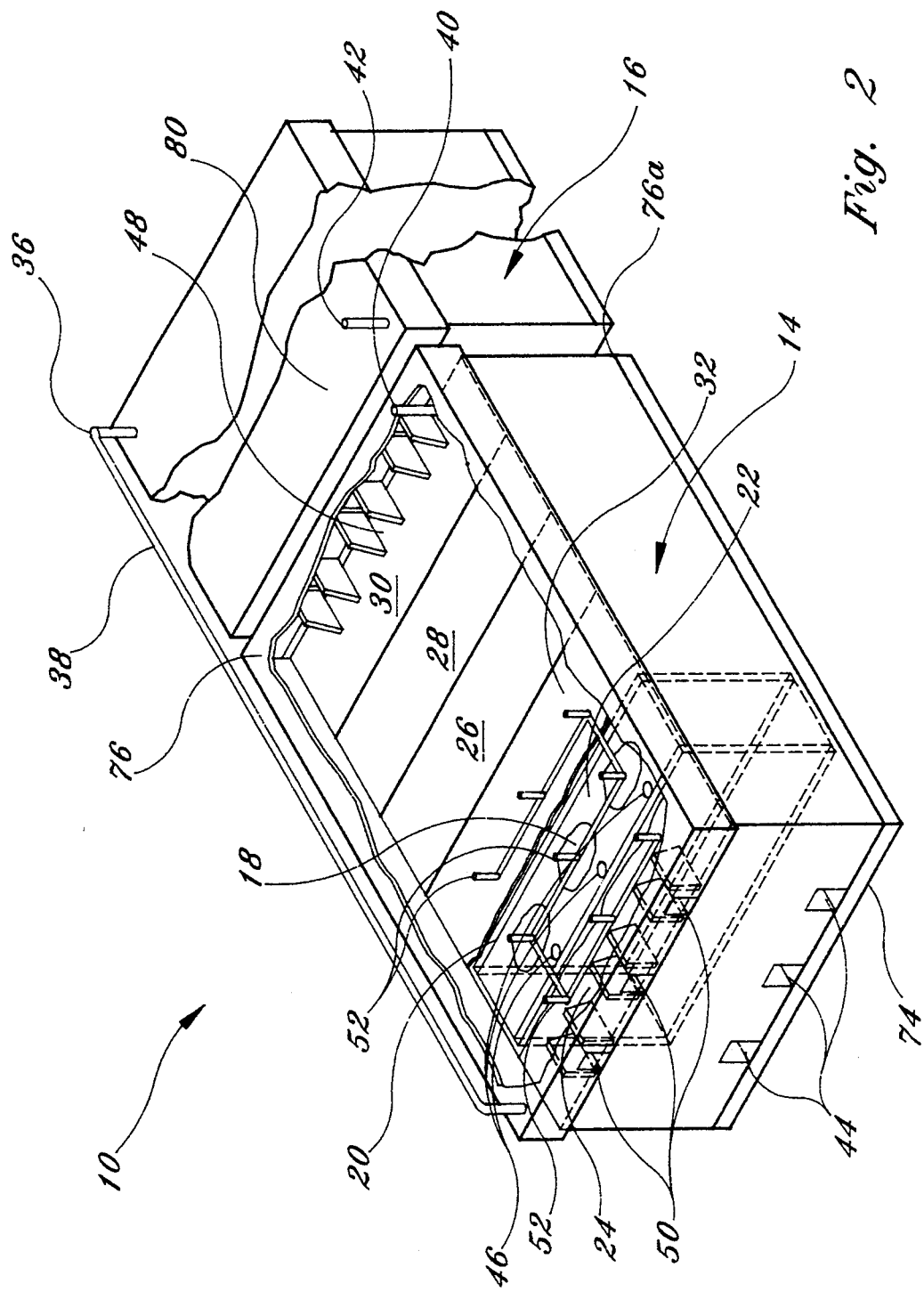
FIG. 2 shows a schematic perspective view, partially cut away, showing portions of the present invention.

Referring now to FIG. 2, a schematic representation of the present invention is shown, which is comprised of a battery that is water-activated and a primary reserve that is actually broken into two separate segments 14 and 16, each of which function electrically independently, but are electrically connected together by a conductor 38 that places the six cells in segment 14 in series with the six cells in segment 16, there being a barrier provided by an upper member 76 that includes a lateral barrier 76a that separates the electrolytic action in segment 14 and an upper surface 80 which also has an L-shaped member (not shown) that separates segment 16 on the upper portion of the battery. The major purpose for separating the battery into two separate sections is to prevent shorting of the electrolytic action across the entire length of the twelve cells, which is thereby prevented through the use of conductor 38, which is connected to an anode 34 on one side 14 and a cathode 36 on the other side 16 across the back area of the battery.

Each cell of the battery in the preferred embodiment contains three separate cuprous iodide pellets 18, a separate frame which is described in detail, two plates, 93% magnesium, 6% aluminum, and 1% zinc (herein often called magnesium), that are physically parallel to each other on each side of one single cell encompassing three separate cuprous pellets, but separated by the frame to provide the proper separation between the magnesium plates and the side area of the cuprous iodide pellets approximately 0.040 inches. Each cell is also separated by a plastic liner that has adhesive attached to one magnesium plate so that each cell is physically separated from each other, but is connected together in series electrically. Within each cell, each cuprous iodide pellet is connected together in parallel. The reason that separate small, individual cuprous iodide pellets are employed is the fact that the material is a powdered metal and is very brittle. Very large segments are undesirable from a structural standpoint. In order to achieve the amount of electrical power necessary, yet preserve the structural integrity of each cuprous iodide pellet, a special frame has been created that is used in each cell to rigidly mount together the three individual cuprous iodide pellets 18 and to also structurally mount the two magnesium thin plates 20 parallel to the three cuprous iodide pellets 18. Therefore, as shown in FIG. 2, in segment 14, there are six cells defined as cells 22, 24, 26, 28, 30, and 32. The upper portion of the schematic housing is broken away to show first of all three cuprous iodide pellets schematically shown at 18, separated by a pair of magnesium plates 20, all of which are in cell 22, that also include a circuit board having three apertures 46 disposed along the top which allow for gas venting from the interaction between the cuprous iodide and the magnesium plates electrolytically to allow the gas to be vented through apertures 46. Each of the cuprous iodide pellets contains an conductor or electrode 52, which itself is connected to two other pellets for one cell in parallel by a circuit board described later. Each cell is in turn connected in series through interconnection of adjacent magnesium plates, separated by a plastic barrier, but electrically soldered together and with soldered together adjacent cuprous iodide electrodes, which can be done in a stairstep pattern to reduce shorting of the battery. The housing thus provides also for gas venting along three separate channels, one for each cuprous iodide pellet for the complete length of six cells for a particular battery segment 14, having vent openings 50 at one end, which are duplicated at the opposite end for segment 16, but which are not interconnected between segments 14 and 16. Therefore, all gas vents for segment 14 will come through apertures 50 at one end of segment 14. Gas-generated element 16 of the battery will be disposed out of the opposite end through similar apertures.

The cuprous iodide and magnesium battery, once water-activated, also generates a sludge that could collect between the plates and electrodes in such a fashion to stop the action of the electrolyte. Therefore, the frame members shown in greater detail below, also include a provision to allow in each cell, three separate sludge removal passages 44, which exit the end of segment 14 and are specifically used only for segment 14. Segment 16 has its own three sludge parallel channels that allow the sludge to be removed out the opposite end. The channels 50 and 44 also allow for segment 14, the water to be received into the sonobuoy chamber and then into the battery elements themselves. Therefore, looking at the embodiment in FIG. 2, one can envision two six-celled batteries fixed together, side-by-side, and electrically connected in series through a conductor 38 with output terminals being 40 and 42, representing the total output of the battery. In this configuration, Applicant's battery can produce, depending on the size of the cuprous iodide pellets and the magnesium plates, a 16-volt output with 400 milliamps that can be sustained for approximately eight hours once activated. The bottom of the entire battery housing is comprised of a rigid plastic part 74, which is rectangular and thin, that extends from one end to the other, and which is glued to segments 14 and 16. (Note also FIGS. 7 and 8). Inasmuch as segment 16 is virtually identical to segment 14, a discussion of segment 16 has not been expanded.

Figure 3:
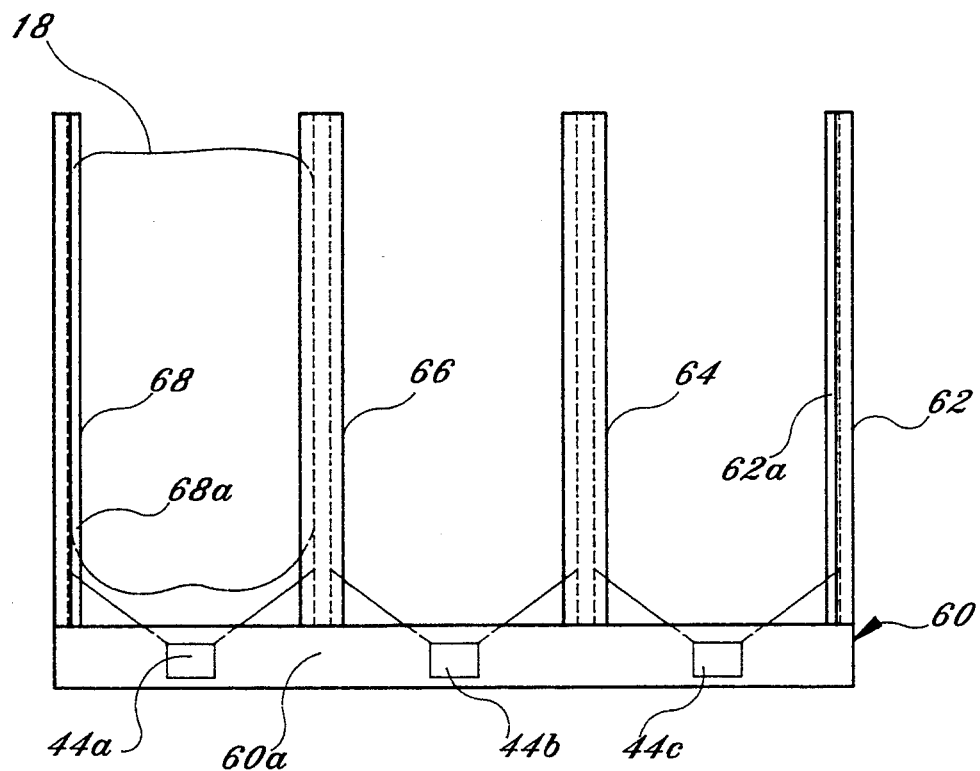
FIG. 3 shows a front elevational view of a single frame member used in a cell in the present invention.
Figure 4:
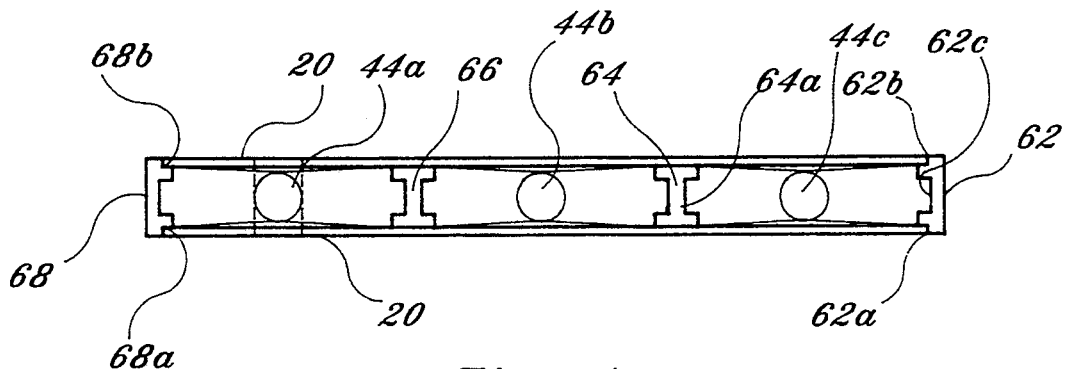
FIG. 4 shows a top plan view of the frame member of FIG. 3.

Referring now to FIGS. 3 and 4, a frame generally shown at 60 for a single cell is shown that includes a plurality of elongated members 62, 64, 66, and 68, the purpose of which is to rigidly retain three cuprous iodide pellets, one in each channel between members 62 and 64, and between 64 and 66, and between 66 and 68. Thus, the three cuprous iodide pellets are separated physically by this plastic frame 60a that is non-conductive. The frame also includes passages in the bottom 44 which allow the sludge to vent and a space is provided which prevents the pellet 18 from blocking a hole in the bottom of the frame and space so that there is an angled trough at the bottom of each separate cuprous iodide pellet holding portion so that sludge can be received into passage 44. Each frame member has grooved portions, such as 62a, 68a which allow the magnesium plates 20 to be mounted flushly on each side of the frame parallel. In addition, the inner members have grooved portions or slots that allow for a cuprous iodide pellet to be mounted, such as between slots 64a and 62c. Note the aperture 60aa in the bottom of the frame. This provides access to channel 40 for sludge removal. The base is tapered towards the aperture so that all the sludge will fall towards the apertures 44a, 44b, and 44c. The purpose of passage 62c, for example, caused by member 62, is to provide spacing between the magnesium plate 20 and the cuprous iodide pellet mounted therein, so that there is the 0.040 inch clearance required between the cuprous iodide pellet in the frame and the magnesium plate 20 which is flush with the end of the frame members.

FIG. 5 shows two cells back-to-back that are separated by an adhesive strip 70, separating the magnesium plates 20 from adjacent cell members, with each cell having three cuprous iodide middle members. The frame 60 has the slotted portions formed by raised tap 60c that hold the pellet 18 in place with additional slot portions to hold the magnesium plates 20 in place for separation by the frame, such as in slots 62a, 62b and slots 68a and 68b. (Note FIG. 4). Voids 72 are created between plates 20 and are used to contain electrolyte introduced within the housing. Each of the cells are then bonded together by tape, both on the sides, along with a rigid plastic material single sheet for rigidity along the bottom (not shown in FIG. 5).

Figure 6:
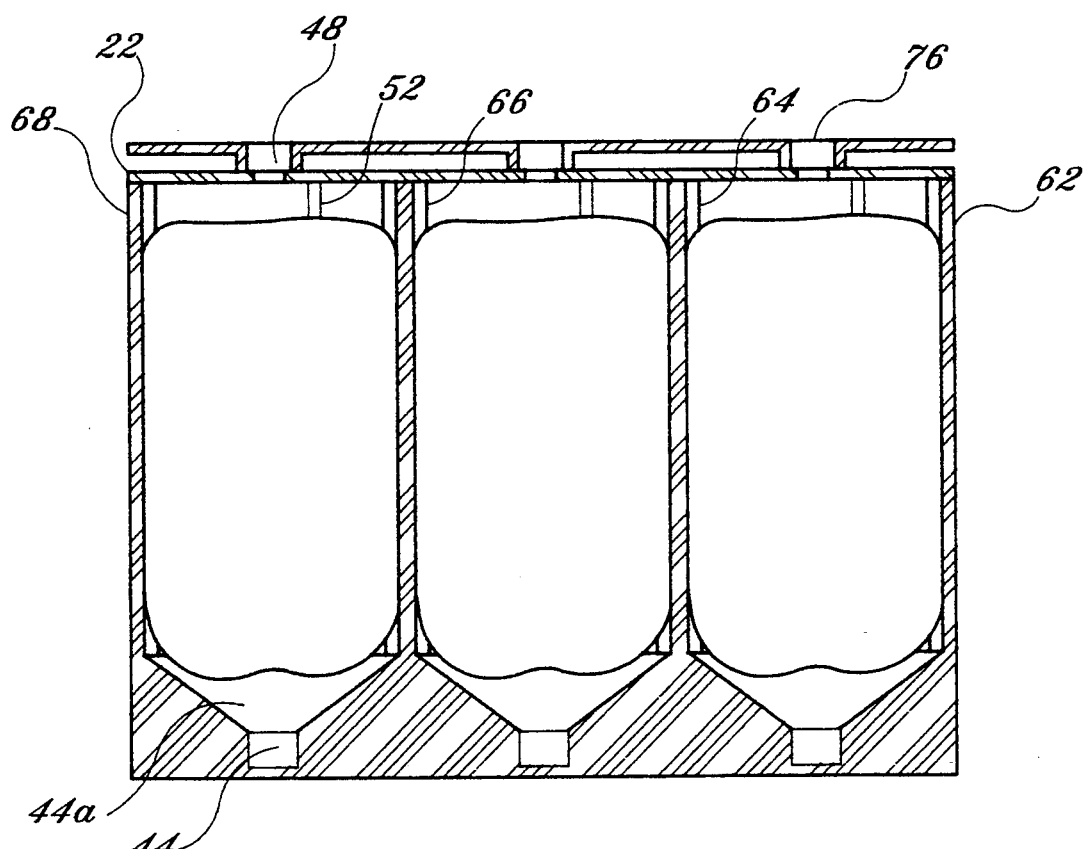
FIG. 6 shows a front plan view of a single cell in cross section in the present invention.

Referring now to FIG. 6, again a single cell is shown that includes the pellets 18 rigidly mounted in frame 60, with each pellet 18 separated by the protruding frame members 62, 64, 66, and 68. The pellets and the magnesium sheets stop at the portion above the lower frame channel 44, providing a sufficient space 44a below the magnesium plate and the pellet for sludge to collect for deposit into channel 44, where it can then be exited out of the battery. The channel 44 runs and is connected together along each of the six cells on one element of the battery. The top portion of each cell includes circuit board 22 that has holes in it and electrically connects together conductors 52 and above that, a rigid plate, having L-shaped edges and L-shaped channels 48, that allow for gas venting and that are aligned with holes in the circuit board 22 for collecting gas vented from the battery action and which run along a total of six cells and are exited out through channels 50 in the one end of segment 14 of the battery.

FIG. 7 shows the separation of a pellet 18 and two magnesium plates 20 separated by frame portion 60. The magnesium plates are separated by frame portion 60 from pellet 18 and also stop at the base at 61, where they rest on 61 flush. Passage 44a is thus shown tapered so that any sludge will flow from passage 44a; into channel 44. The frame members are supported on a rigid board 74.

Figure 8:
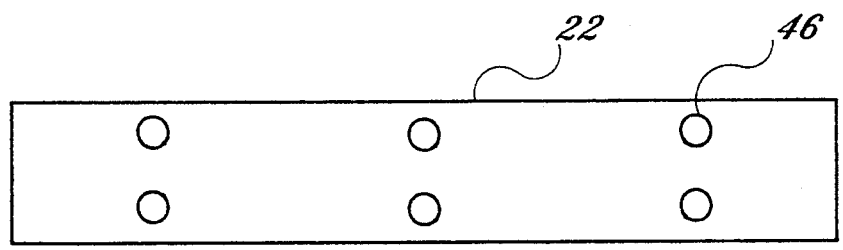
FIG. 8 shows a top plan view of a circuit board used with a single cell in the present invention.

FIG. 8 shows a circuit board 22 that is accompanied with each cell with apertures 46 which allow gas to be vented. The circuit board has electrical conductors that connect each pellet 18 together through its electrode 52 in parallel and rests on top of the frame members 60 and the pellets 18. Each cell has its own circuit board 22 so that the plastic sheet that separates each cell also separates each circuit board 22 from adjacent cells. Electrically, each of the cells is soldered together in series through its positive and negative electrodes.

FIG. 9 shows two cells side-by-side in a top plan view that shows the frame 60 that rigidly holds pellet 18 and separates it from magnesium plate 20 that is also separated each cell from each other by a plastic sheet 70 that has adhesive thereon.

Referring now to FIG. 10, a single cell frame is shown with a frame end 68 having slots 68a and 68c that receive the magnesium plate 20 on one side and on the other side a frame member having a slot 66a that receives a pellet 18 with its electrode 52 fitting into a slot shown on member 68. The circuit board 22 is shown with a conductor 22a that adjoins an aperture 45 where the electrode 52 proceeds through. Aperture 46 in the circuit board is to allow gas to vent. The upper rigid member is shown that has one passage 48 that provides for gas venting that aligns with the gas vent aperture 46 in the circuit board, which is transported for a set of six cells out of the end shown as aperture 50 in FIG. 2.

FIG. 11 shows a representative single pellet 18 of cuprous iodide having electrode 52, each of which would fit in one frame holding three separate pellets, separated apart.

Figure 12:
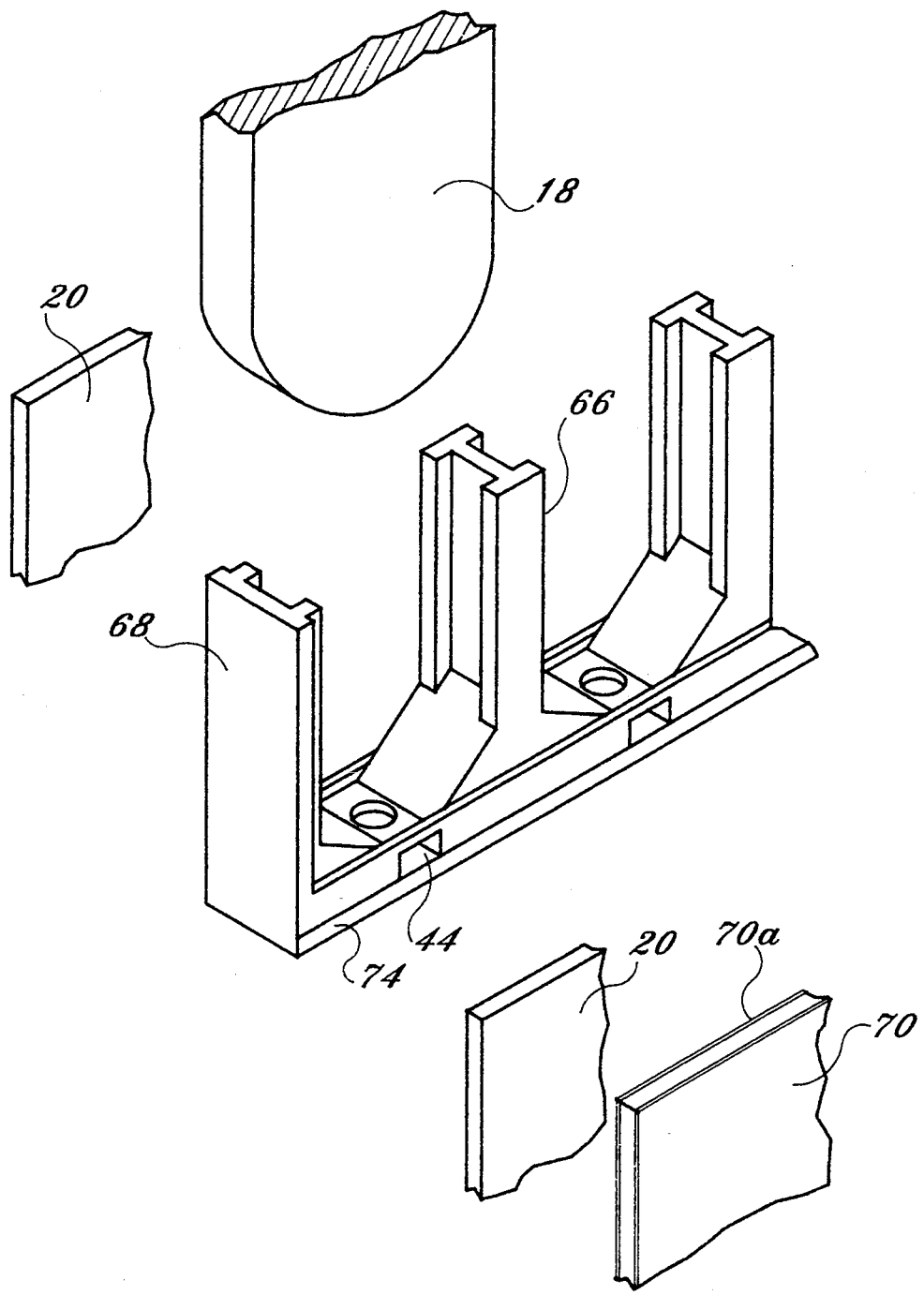
FIG. 12 shows a perspective exploded, partially cut away view of a corner section of one cell utilized in the present invention.

FIG. 12 shows the base of the frame member, such as 68, with a lower rigid board 74 that runs the length of the battery. The frame includes slots to receive the magnesium plates 20 on each side flushly, and the pellet 18 in the slotted interior. Channel 44 is mounted in the base of the frame member and allows the sludge collecting in the bottom to be removed out the outside of the device. A plastic waterproof sheet 70, having adhesive 78 is firmly affixed and extends beyond the magnesium plate 20, defining the side of each cell so that each cell is separated by the plastic sheet 70.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A water-activated, primary reserve battery that is safe for environmental use, comprising:

a battery housing, including first, second and third frame members;

a first cuprous iodide pellet mounted between said first and second frame members;

a second cuprous iodide pellet mounted between said second and third frame members;

first and second magnesium plates mounted to the respective sides of said first and second frame members and separated from said first cuprous iodide pellet;

third and fourth magnesium plates mounted to the respective sides of said second and third frame members and separated from said second cuprous iodide pellet;

a waterproof flexible barrier disposed between said first, second and third frame members for separating adjacent magnesium plates;

first means for electrically connecting said first pellet means to said second pellet means; and second means for electrically connecting said first, second, third, and fourth magnesium plates so that said first means for electrically connecting said first and second cuprous iodide pellets and the second means for electrically connecting said first, second, third and fourth magnesium plates function as battery electrodes.

2. A water-activated, primary reserve battery, comprising:

a rigid non-conductive frame including a plurality of support members having a planar profile;

a plurality of individual cells, each formed having three separate cuprous iodide pellets mounted in said frame;

first and second magnesium plates mounted within said frame, each respective plate being separated from said pellets and being on opposite sides of said frame;

circuit board means for electrically connecting said first, second, and third cuprous iodide pellets, said circuit board means including gas vent holes and an electrical conductor, said conductor connecting the anodes of the cuprous iodide pellets in parallel; and at least one aperture means located in the bottom of said frame for permitting the removal of sludge formed during the operation of the battery.

3. A battery as in claim 2, further comprising:

means for providing an impervious barrier between each of said cells for preventing the escape of fluid introduced into said housing and surrounding each of said cells;

an upper housing member having a plurality of channels for receiving gas vented from each of said pellets; and a lower rigid member for providing at least one sludge disposing channel; said channel attached to an outlet at the bottom of each respective cell.

4. A battery as in claim 3 further comprising:

means for electrically connecting at least six cells in a series arrangement for producing a potential of approximately 12 volts.

* * * * *